United States Patent [19]

Brooks et al.

[11] Patent Number: 4,776,205
[45] Date of Patent: Oct. 11, 1988

[54] TESTING DEVICE

[75] Inventors: James Brooks, Roseville; Charles G. Gerlach, Mt. Clemens; Louis J. Perry, Birmingham, all of Mich.

[73] Assignee: Antares Engineering, Inc., Madison Heights, Mich.

[21] Appl. No.: 845,956

[22] Filed: Mar. 31, 1986

[51] Int. Cl.[4] ............................................. G01B 13/10
[52] U.S. Cl. ...................................................... 73/37.9
[58] Field of Search .................. 73/37.9, 37.8; 33/548, 33/560, 572

[56] References Cited

U.S. PATENT DOCUMENTS

| | | | |
|---|---|---|---|
| 2,669,864 | 2/1954 | Brewster | 73/37.9 |
| 3,793,875 | 2/1974 | Jurkiewicz | 73/37.9 X |
| 4,412,385 | 11/1983 | Selleri | 33/548 X |
| 4,437,335 | 3/1984 | Gates | 73/37.9 |

Primary Examiner—Stewart J. Levy
Assistant Examiner—Joseph W. Roskos
Attorney, Agent, or Firm—John R. Benefiel

[57] ABSTRACT

A multimode testing device is disclosed for automatic testing of a threaded feature on a workpiece, comprised of a housing mounting a forward extending probe tip having an outlet supplied with air pressure via internal passages in the housing. In the first test mode, an obstruction test is made to detect the absence of the threaded feature or the presence of a broken tool, the obstruction test made by advance of the probe tip into the threaded feature. A contact of the probe tip with an obstruction causes blockage of an internal passage and an increase in back pressure therein which is detected by a pressure sensor. If no obstruction is detected, a second test mode is initiated by tilting the probe tip by an air cylinder operated actuator rod formed with cam surfaces interfit with complementary surfaces on a thrust rod mounted to push the probe tip sideways. A proximity detector senses if overtravel of the thrust rod occurs, as caused by any of various abnormal conditions, such as if either the workpiece or probe tip are absent, or due to an improper sizing of the threaded feature. In the final test mode, the tilting of the probe tip causes positioning of a side directed air outlet against the bore wall, and in the absence of threads an increased back pressure is detected by the pressure sensor.

9 Claims, 2 Drawing Sheets

TESTING DEVICE

BACKGROUND OF THE INVENTION

1. Field of the Invention

This invention concerns automatic testing devices and more particularly devices for automatically checking proper completion of the machining of threaded features in a workpiece by a multimode testing device.

2. Description of the Prior Art

In automatic multistage machining of workpieces with equipment such as transfer lines, it is common for threaded features such as bores and studs to be formed in or on the workpiece.

In such automatic machinery, it is desirable to monitor the condition of each workpiece to insure that each operation has been satisfactorily completed, such as the proper drilling and tapping of each hole machined into the workpiece.

Typically a large number of threaded holes must be machined into the workpiece in close proximity to each other.

In U.S. Pat. No. 4,437,335, assigned to the same assignee as the present application, there is disclosed a multifunction threaded bore testing device utilizing a probe which is caused to enter the hole, and then pivoted to bring an air outlet in the probe tip into engagement with the bore surface.

Detection of an increased pressure upstream from the air outlet when threads are absent from the bore enables detection of an unthreaded condition of the bore surface.

In the aforementioned patent, the probe tip is tilted by means of a transversely aligned air cylinder to bring the probe into contact with the bore wall. A limit switch detects overtravel which could occur if the part or probe tip was missing. The use of a limit switch does not allow for more refined fault detection, such as out of tolerance sizing of the threaded feature.

While this device has been successfully employed, it does require a sufficient width of the housing to accommodate the transverse air cylinder and the limit switch employed to detect probe overtravel.

It has often been the practice that a number of the individual probes will be stacked together at a single station to simultaneously test a number of holes in a workpiece, and in such situations the housing width should desirably be minimized.

Furthermore, the making of electrical and air supply connections is not convenient in the arrangement shown in U.S. Pat. No. 4,437,335, since the fittings therefor are located on the side of the housing at spaced locations.

Another problem is encountered in accurately aligning the detectors, since each must be adjusted to be accurately aligned with the bore to be tested.

In the aforementioned patent, each testing unit is separately mounted to extend from a mounting plate, and each is adjusted to be accurately located with respect to the bore location during testing. This involves considerable set up time initially, and also when a unit is replaced after servicing.

It has been heretofore known to provide a burst of air to blow out chips from the bore prior to the test, but this has been done at relatively high pressure, and this requires valved control of the blowout air pressure, increasing the complexity of the device.

Accordingly it is an object of the present invention to provide an improved multimode threaded feature testing device having a tilted probe tip with an overtravel test feature while maintaining a narrow width device.

It is yet another object of the present invention to provide a highly accurate overtravel detection mode, which may detect over or under size conditions of the threaded feature.

It is also an object of the present invention to provide an air blowout feature in such a testing device which does not require separate control valving.

It is another object of the present invention to provide a simplified mounting arrangement for accurately aligning the devices with the bores to be tested, and rear located air and electrical connections.

SUMMARY OF THE INVENTION

These and other objects of the present invention are achieved by an improved threaded diameter testing device of the type described, featuring a probe tip formed with an air outlet receiving pressurized fluid, and adapted to be tilted to be moved into engagement with the side wall of a threaded diameter to test for the presence of threads. The tilting is achieved by an air cylinder and an actuator rod each mounted parallel to the probe tip, the actuator rod having cam surfaces interengaging with cam surfaces on a transversely mounted thruster rod adapted to engage and push the probe tip. A proximity detector is also mounted to extend parallel to the probe so as to be positioned adjacent one end of the thrust rod to accurately detect overtravel movement thereof, and enable detection of improperly sized diameters, as well as the complete absence of the workpiece or probe tip. The parallel extending orientation of the air cylinder, actuator rod and proximity detector allows a narrow width device to be provided.

A blowout outlet at the end of the probe tip is constantly pressurized with air at thread test pressure to obviate the need for separate control valving.

All of the electrical and pressure connections are located at the rear of the device to insure efficient servicing and installation.

The device is adapted to be located in a precision fixture plate by an accurately machined pilot surface on the forward end of each device fit into a corresponding bore accurately located on the located fixture plate insuring quick set up and replacement.

DETAILED DESCRIPTION

In the following description, certain specific terminology will be employed for the sake of clarity, and a particular embodiment described in accordance with 35 USC 112, but it is to be understood that the same is not intended to be limiting and should not be so construed inasmuch as there are many variations possible within the scope of the appended claims.

Figure 2:
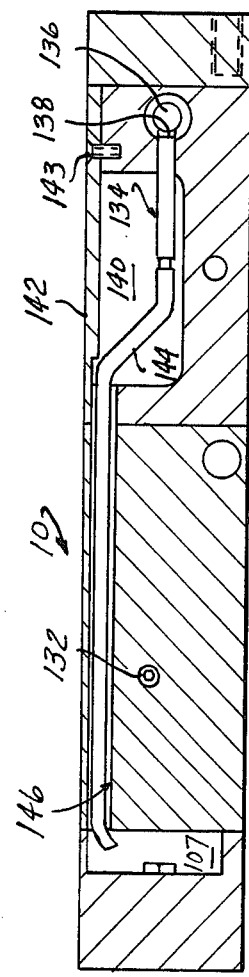
FIG. 2 is a plan sectioned view of the device shown in FIG. 1.
Figure 1:
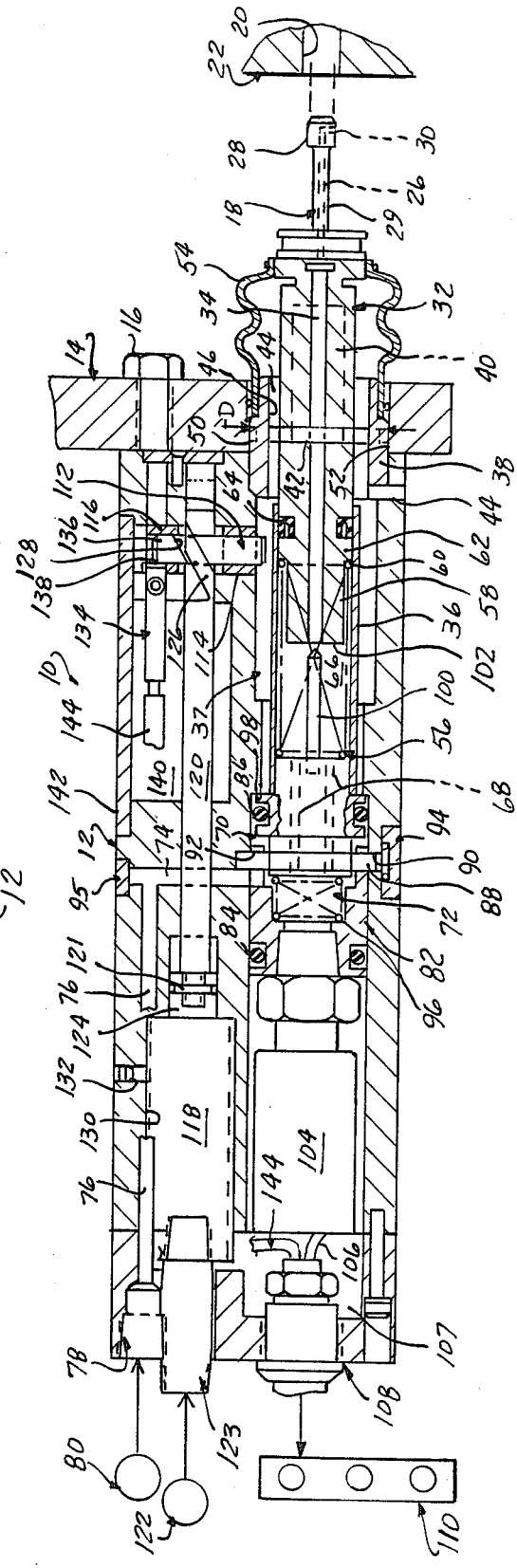
FIG. 1 is a longitudinally sectioned side elevational view of a testing device according to the present invention, with diagrammatic representations of associated components.

Referring to the drawings and particularly FIG. 1, the testing device 10 according to the present invention includes a housing 12 adapted to be mounted to a fixturing plate by bolts 16 so as to dispose a probe tip 18 aligned with a diameter here taking the form of a bore 20 extending into a workpiece 22.

The entire assembly of the fixture plate 14 and one or more testing devices 10 is mounted to be moved together towards and away from the workpiece 22 so as to move the probe tip 18 into and out of a bore 20 to be tested.

The probe tip 18 includes an elongated rod 29 formed with an air passage 26 and a probe tip head 28 formed with a transversely directed air outlet 30 receiving air from passage 26 for testing purposes to be described herein. Air passing from outlet 30 provides an air jet for blowing out any chips in bore 22 as the probe tip 18 is moved into the bore 22.

Thus, air to provide chip blowout does not require separate control valving.

Many configurations of probe tip 18 may be employed suited to the particular application, i.e., to internal or external threaded features.

The probe tip 18 is affixed to a carrier plug 32 having an internal passage 34 aligned with passage 26.

Carrier plug 32 is slidably received in one end of a sleeve 36, both of which are disposed extending within an opening 37 formed in housing 12.

A pilot bushing 38 having an accurately finished O.D. is fit within a bore 20 formed in fixture plate 14 to locate the device 10 to be accurately aligned with bore 20.

Figure 4:
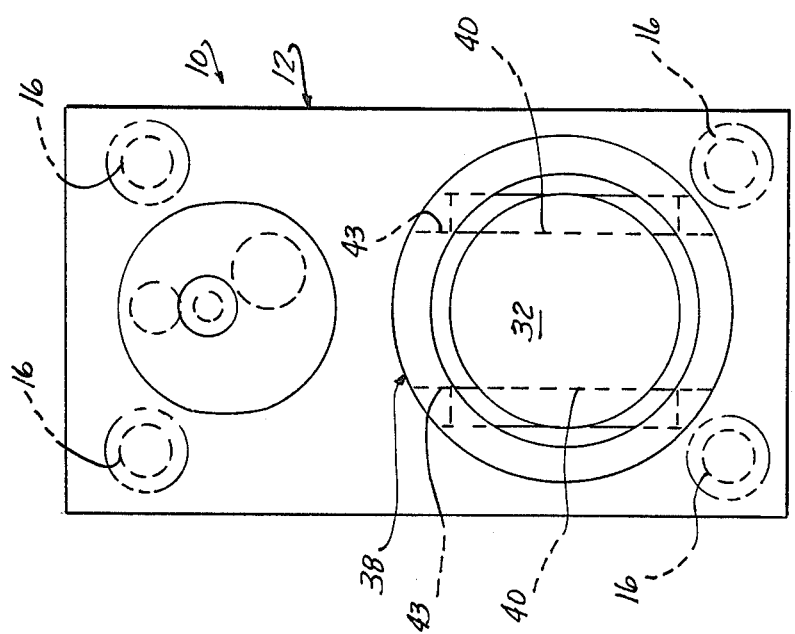
FIG. 4 is a front end view of the device shown in FIG. 1.
Figure 3:
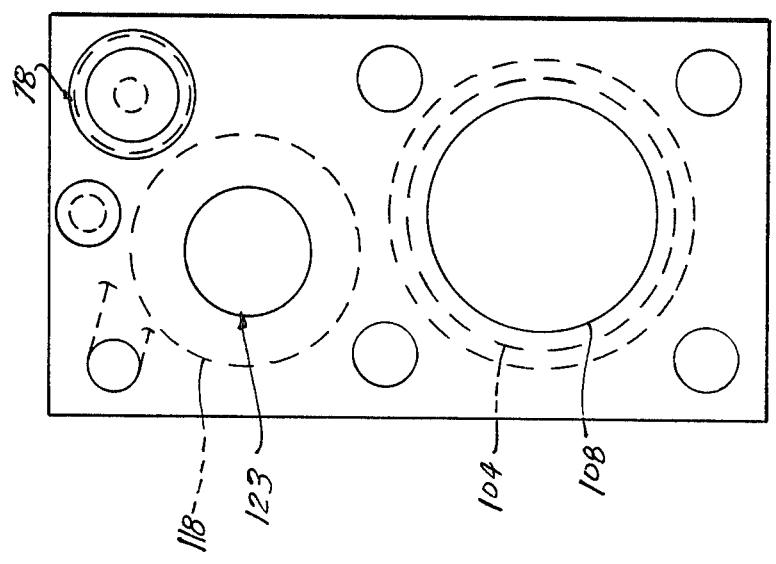
FIG. 3 is a rear endview of the device shown in FIG. 1.

The carrier plug 32 formed with opposing flats 40 such that retainer pins 42 installed in bores 43 machined in the pilot bushing 38 extend alongside the flats 40 (see also FIG. 4) to act to retain the carrier plug 32 in the housing 12. A dowel pin 45 extending through holes drilled in the housing 12 locates the pilot bushing 38 with the bores 43 properly oriented to align the carrier plug 32 with the other components to be described.

A clearance space 44 is provided between the inside diameter of a bore 46 formed in the pilot bushing 38 to accommodate limiting tilting movement of the carrier plug 32 to be described.

The test device 10 is accurately located by interfitting of the finished OD 50 of the pilot bushing 38 with a bore 52 machined in the fixture plate 14, which fixture plate is premachined with an array of bores accurately corresponding with the location of an array of bores in the workpiece 22 to be tested. Fixture plate 14 in turn is mounted to align each test device 10 with each corresponding bore 20 in the workpiece 22.

As an alternative, eccentrically mounted bushings (not shown) may be employed to accurately locate the bores in the fixture plate 14.

This makes installation and replacement of a number of test devices much more rapid, since individual location adjustments of each test device 10 are thereby obviated.

A shielding bellows 54 is fit over the forward end of the carrier plug 32 and the pilot bushing 38, while accommodating in-and-out and tilting movement of the carrier plug 32.

The carrier plug 32 is urged to its fully extended position against pins 42 as shown in FIG. 1, by a bias spring 56 disposed within sleeve 36, received over a reduced diameter section 58 of the carrier plug 32, and having its forward end seated on a shoulder 60 formed by the transition to the full diameter sections 62 of the carrier plug 32.

The carrier plug 32 is sealed to the inside diameter of the sleeve 36 by means of a seal 64 disposed in a groove recessed into carrier plug 32 as shown.

The interior space 66 within the sleeve 32 is pressurized by air under pressure communicated therein by a pair of passages 68 formed in a forward plug 70 fit within opening 37 formed in the housing 12. Passages 68 open into a space 72 to the rear of forward plug 70, space 72 in turn pressurized via cross drilled passages 74 and 76 and part 78 in housing 12, by a source of air pressure 80.

Air pressure source 80 may be "shop" air filtered and regulated to moderate pressures (i.e., 30 psi). Space 72 is also defined by a rear plug 82 fit into opening 37, with a seal 84 in rear plug 82 and seal 86 in front plug 70 insuring a pressure tight sealing off of space 72.

Front plug 70 as well as rear plug 82 are axially located within the opening 37 by means of a spring "roll" pin 88 inserted through opening 90 in housing 12 and into aligned cross holes in the front plug 70 and rear plug 82 and seated in aligned opening 92 opposite opening 90. Sealing plugs 94 and 95 seal off the interior space 72.

Roll pin 88 locates the carrier plug axially but allows a slight amount of play to accommodate tilting of the carrier plug 32. A bias spring 96 urges the front plug to the right to insure location against a shoulder 98 as shown.

Front plug 70 mounts a pin 100 extending to the right and aligned with passage 34 as it exits the rear face 102 of section 58 of the carrier plug 32.

As noted, the entire assembly is moved towards the workpiece 22 during the test cycle. If the probe tip 18 does not pass into the bore 20 for any reason, (i.e., the bore 20 was not formed or is too shallow, or because of the presence of a broken tool) the forward motion of the probe tip 18 is arrested and the carrier plug 32 is pushed back into the housing against the action of the spring 56.

This brings the pin 100 into passage 34, restricting the flow of air out of space 72 and causing a substantial rise in back pressure in space 72.

A pressure sensing transducer 104 is mounted to the rear plug 82 so as to generate electrical signals corresponding to the pressure in space 72, which are transmitted via leads 106 and connected electrical fitting 108 located at the rear end of housing 112 to a signal processor and indicator 110, which provides a visual and/or audible signal corresponding to the detected condition.

If the probe tip 18 passes into the bore 20, and moves to the full predetermined distance thereinto, the pin 100 remains to the rear of end face 102, and the pressure in cavity 72 remains at the same level.

After the probe tip 18 has reached a predetermined depth in the bore 20, the second test phase is initiated to determine if the workpiece 22 and probe tip 18 are present, and if the bore 20 is of proper diameter.

This is achieved by a slight tilting motion of the carrier plug 32 and sleeve 36.

This tilting motion is caused by a thrust rod 112 slidably received in spaced bushings 114 and 116 fit into a cross bore machined into housing 12. The thrust rod 112 protrudes into space 37 aligned with the side of sleeve 36 and carrier plug 32.

The thrust rod 112 is caused to be actuated so as to be reciprocated in bushings 114 and 116 by an actuator air cylinder 118 disposed parallel to the length of the device 10 (and transversely to thrust rod 112) which includes an actuator rod 120 pinned at 121 to an output member 124 of the actuator air cylinder 118.

The air cylinder 118 is controllably pressurized via fitting 123 located on the rear end face of housing 12, by a pneumatic circuit 122.

The actuator rod 120 is formed with a sloping cam surface 126 which is complementary to and mates with a corresponding cam surface comprising angled slot 128 machined into thrust rod 112.

Accordingly, as air cylinder 118 is activated, the actuator rod 120 is moved to the right, camming thrust rod 112 downwardly into contact with the side of sleeve 36 and carrier plug 32, causing tilting motion of the probe tip 18 to the side.

The actuator cylinder 118 is spring returned so that the actuator rod 120 and thrust rod 112 are returned to the left upon depressurization thereof by circuit 122.

In order to insure accurate location of the thrust rod 112 and proper mating of cam surfaces 126 and 128, the air cylinder 118 is threadably mounted in a bore 130 machined in the housing 12, a set screw 132 locking the cylinder 118 in its adjusted position.

In order to detect an overtravel of the thrust rod 112, as could be caused by the complete absence of a workpiece 22 or the probe tip 18 itself, so that the probe tip 18 does not move against the side wall of the bore 22, a proximity detector 134 is provided.

The proximity detector 134, which may be any of a number of known magnetic reed or other type devices, generates an electrical signal very accurately corresponding to movement of the end 136 of the thrust rod 112 away from the end 138 of proximity detector 134.

The proximity detector 134 is also mounted in a cavity 140 formed in the housing 12 to extend parallel to the probe tip 18, with an access plate 142 mounted thereon with screw 143. Electrical leads 144 extend to the rear through slot 146 to cavity 107 and via electrical fitting 108 to the indicator and signal processing circuitry 110.

Thus, upon actuation of air cylinder 118, the thrust rod 112 is caused to push the carrier plug 32 downwardly. If a part 22 is present, and the probe tip 18 has previously been inserted into the bore 20, the probe tip 18 is pushed against the side wall of bore 20 to limit the extent of tilting motion. In this position, the end 136 of the thrust rod 112 is not moved completely away from the proximity detector 134.

If a part is absent, continued tilting will occur, and the end 136 of the thrust rod 112 will move completely away to generate an electrical signal corresponding to this condition, which is displayed by indicator 110, as a second mode of test reject.

The use of the highly accurate proximity detector 134 also allows detection of an over or undersized condition of the diameter tested in addition to the conditions described above.

In the final mode of testing, if a part is present the probe tip 18 moves against the side wall of bore 22. If the bore 22 is formed with threads, some escape of air through passage 30 occurs.

If the bore 22 is unthreaded, only a minimal escape of air from passage 30 is possible, and this results in an increase in back pressure in cavity 72, which is detected by pressure transducer 104, and an electrical signal is generated causing a display of a failed test, as by indicator 110.

Accordingly, it can be appreciated that a reduced width and height testing device has been provided by the arrangement of the air cylinder 118 and actuator rod 112 and the proximity detector 134.

It will also be noted that all air and electrical connections are located at the rear end face of the device to facilitate assembly, particularly when a number of these devices are assembled together in close proximity.

Also, the installation of a plurality of testing devices is much simplified by the use of a locating pilot and a corresponding accurately machined fixture plate 14.

We claim:

1. A testing device comprising;
    an elongated housing;
    a probe tip;
    means for mounting said probe tip to said housing so as to extend from one end of said housing, said means including a carrier plug received within said housing;
    said probe tip comprised of an elongated rod having an end portion;
    passage means within said probe tip including a passage formed within said elongated rod communicating with a cross passage also included in said passage means, said cross passage exiting out of said end portion of said probe tip;
    pressurizing means for causing fluid under pressure to be communicated to said passage means, including a cavity formed in said housing communicating with said passage means, and means for pressurizing said cavity;
    a carrier plug mounted in said housing for limited tilting movement therein;
    a thrust rod transversely mounted in said housing and located to drivingly engage said carrier plug upon endwise movement thereof from a retracted position to cause tilting movement of said carrier plug and probe tip;
    actuator means for causing reciprocal endwise movement of said thrust rod comprising an actuator device mounted in said housing and having an output member movable in a lengthwise direction parallel to said probe tip upon activation thereof;
    an actuator rod connected to said actuator output member to be moved therewith in lengthwise direction;
    cam means drivingly interengaging said actuator rod and said thrust rod causing transverse endwise movement of said thrust rod upon lengthwise movement of said actuator rod; and
    detector means for detecting travel of said thrust rod past a predetermined point.

2. The testing device according to claim 1 wherein said detector means comprises a proximity detector mounted in said housing and extending in a lengthwise direction and having an end portion positioned adjacent an end of said thrust rod with said thrust rod in said retracted position and generating an electrical signal upon movement completely away therefrom.

3. The testing device according to claim 2 further including a pressure detector mounted in said housing extending in a lengthwise direction and adapted to sense pressure in said pressurized space.

4. The testing device according to claim 3 further including electrical leads extending from said detector means and an electrical fitting at the rear end of said housing connected to said electrical leads.

5. The testing device according to claim 2 wherein said means for pressurizing said cavity includes a passage extending in a lengthwise direction to a rear end of said housing, and a fitting located at said rear end adapted to be connected to a source of air pressure.

6. The testing device according to claim 5 wherein said actuator device comprises an air cylinder mounted in said housing extending parallel to said probe tip, and includes a supply passage therefor extending to the rear end of said housing and a fitting adapted to be connected to a supply of fluid under pressure for actuation thereof.

7. The testing device according to claim 1 wherein said actuator rod is formed with cam surfaces sloping with respect to the direction of movement of said actuation rod; and said thrust rod is formed with cam surfaces sloping with respect to said transverse direction and in mating relationship with said actuator rod cam surfaces.

8. The testing device according to claim 7 wherein said actuator device is threadably mounted in said housing for adjustment, and further including means for locking said adjusted position.

9. The testing device according to claim 1 wherein said passage means also includes a blowout outlet opening from the end portion of said probe tip, said pressurizing means constantly supplying said blowout outlet with fluid pressure from said cavity to provide a blowout jet issuing therefrom for removing chips.

* * * * *